United States Patent [19]
Eichinger et al.

[11] 4,129,394
[45] Dec. 12, 1978

[54] PIVOT PIN FOR JOINTS, PARTICULARLY UNIVERSAL JOINTS OR THE LIKE

[75] Inventors: Johann Eichinger, Putzbrunn; Manfred Hirt, Munich, both of Germany

[73] Assignee: Carl Hurth Maschinen- und Zahnradfabrik, Munich, Germany

[21] Appl. No.: 809,195

[22] Filed: Jun. 23, 1977

[30] Foreign Application Priority Data
Jul. 5, 1976 [DE] Fed. Rep. of Germany ....... 2630205

[51] Int. Cl.² ............................ F16D 3/00; E21B 19/16
[52] U.S. Cl. ........................................ 403/57; 403/120; 403/221; 403/203; 403/226; 403/269
[58] Field of Search ................ 403/203, 221, 223, 226, 403/228, 57, 58, 120, 125, 151, 150, 268, 269

[56] References Cited
U.S. PATENT DOCUMENTS

| 2,855,232 | 10/1958 | Kozak | 403/226 X |
| 2,880,991 | 4/1959 | Ward | 403/223 X |
| 3,030,132 | 4/1962 | Compton | 403/203 |
| 3,117,810 | 1/1964 | Hutton | 403/203 |
| 3,329,453 | 7/1967 | Patton | 403/221 |

Primary Examiner—Wayne L. Shedd
Attorney, Agent, or Firm—Blanchard, Flynn, Thiel, Boutell & Tanis

[57] ABSTRACT

A pivot pin construction for pivot joints, particularly universal joints wherein an inner and an outer member are provided in the construction. A spacing is provided between the inner and outer members and a resilient mass is secured in the spacing. The spacing between the inner and outer members is enlarged at the axial ends thereof so that when the pivot pin is displaced, the volume of the displaced resilient mass in one plane plus the volume of the displaced resilient mass in an adjacent plane is absorbed by the volume between the two surfaces in the respective plane.

5 Claims, 4 Drawing Figures

PIVOT PIN FOR JOINTS, PARTICULARLY UNIVERSAL JOINTS OR THE LIKE

FIELD OF THE INVENTION

The invention relates to a pivot pin construction for pivotal joints and, more particularly, to a pivot pin construction for universal joints.

BACKGROUND OF THE INVENTION

In the known pivot pins of this type, the cooperating surfaces are arranged substantially parallel (see for example German Pat. No. 860 730). It was observed that the resilient mass separates during operation from the surfaces after a certain time.

The basic purpose of the invention is to provide a pivot pin construction for example for the wheel suspension in rail vehicles, in which between two cooperating surfaces of the pin there is inserted a resilient mass, for example rubber or the like and is secured on both sides on these surfaces, through which the inclination adjustment of the pin is carried out as a form change of the resilient mass, and in which the resilient mass adheres better than before to the cooperating surfaces.

The purpose is attained with a pivot pin construction wherein the radial spacing between the two surfaces is enlarged from the axially central plane toward the two axially facing sides so that at a relative inclination of the pin the volume of the displaced resilient mass of one plane plus the volume of the displaced resilient mass of the respective adjacent plane is absorbed by the volume between the two surfaces in the respective plane. In designing the pivot pin according to the invention, it must be assured that at a given deflection the displaced volume, viewed aggregatedly, causes in each cross sectional plane approximately the same form change, so that the shear stress does not exceed a permissible high limit value in particular at the adhesive surfaces. If the solidity characteristics, in particular the modulus of elasticity of the elastic material and of the adhesive material, are known, it is possible to determine by calculation the enlargement of the space between the surfaces. On the other hand, the enlargement can be determined by tests.

Some favorable possibilities are offered for the development of the invention wherein the surfaces are spherical and conical. Combinations thereof can also be advantageous. One must add to these combinations also advantageously ellipsoids and similar members.

Further advantages and characteristics of the invention can be taken from the following description.

The invention is discussed with reference to the exemplary embodiments illustrated in FIGS. 1 and 2.

DETAILED DESCRIPTION

Figure 1:
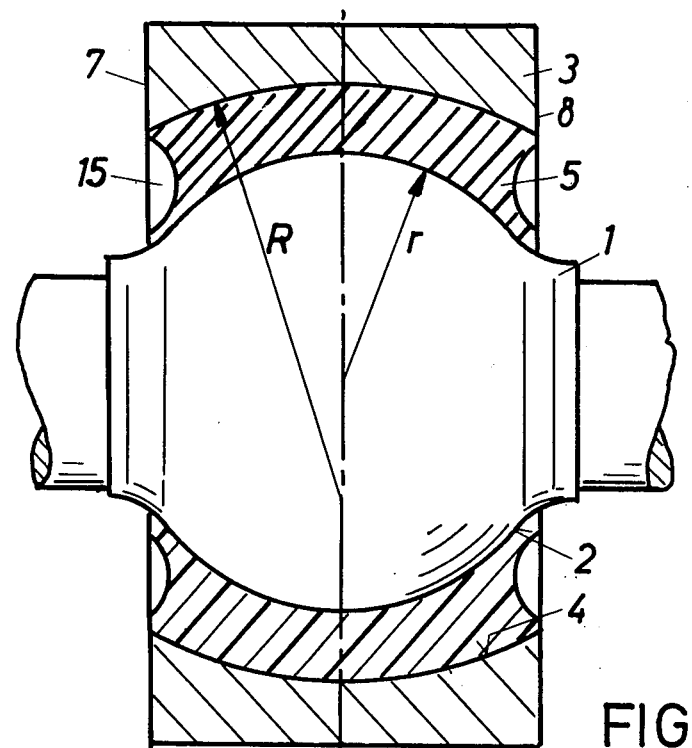
FIG. 1 illustrates an exemplary embodiment of the invention having ball-like surfaces.

FIG. 1 is a partial cross-sectional view of a pivot pin 1 having a spherical outer surface 2 which has a radius r. The outer surface 2 is enclosed by a monolythic hub 3 or the like having a spherical inner surface 4 which has greater radius R. The spacing 5 between the radii r and R is filled with a resilient mass, for example rubber, and is secured to the inner and outer surfaces 2 and 4 by for example vulcanizing or an adhesive. When the pivot pin is deflected relative to the hub, the resilient mass is stretched on one side of a central plane 6 and compressed on the other side. Since the volume of material which is displaced during compression is added from the center plane 6 toward the respective axially facing side, for example 7, the adhesive is overstressed in the case of parallel inner and outer surfaces so that the resilient mass becomes separate. For this reason the radii r and R are adjusted to one another so that the spacing 5 between the surfaces enlarges toward the axially facing sides 7, 8, namely, so that it is able to absorb in each cross sectional plane the displaced volume of the same plane and also of the adjacent plane. Since the added volume becomes larger toward the axially facing sides, the spacing between the inner and outer surfaces must be inventively enlarged corresponding with this addition.

Figure 2:
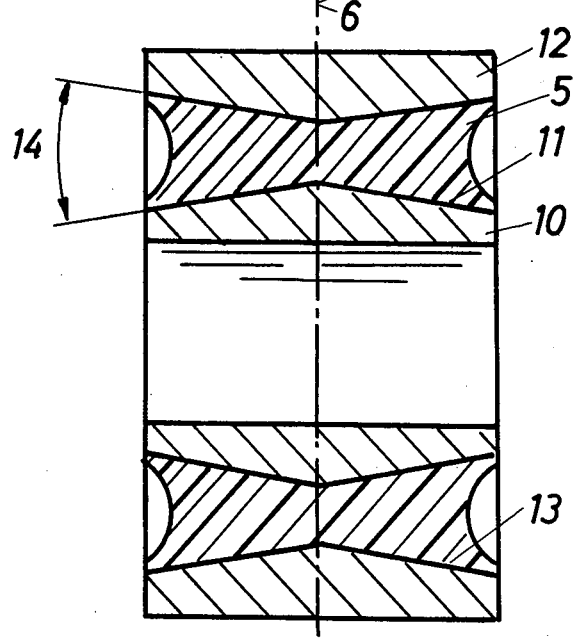
FIG. 2 illustrates an exemplary embodiment having conical surfaces.

FIG. 2 illustrates an exemplary embodiment in which an inner hub 10 is provided with a conical outer surface 11 and the monolythic outer hub 12 is provided with a conical inner surface 13. The cones thus form an angle 14. The above-discussed viewpoints are equivalently true for the enlargement of the volume.

The resilient mass has in both embodiments one recess 15 in each of the axially facing sides in order to prevent, on the one hand, the displaced volume from bulging out at the axially facing sides and, on the other hand, to make the stretching of the resilient mass easier.

The invention is not limited to the illustrated forms. Inner and outer surfaces can basically be of any desired shape. It is only important that the volume of the resilient mass be received additively in the space between the inner and outer surface.

Figure 3:
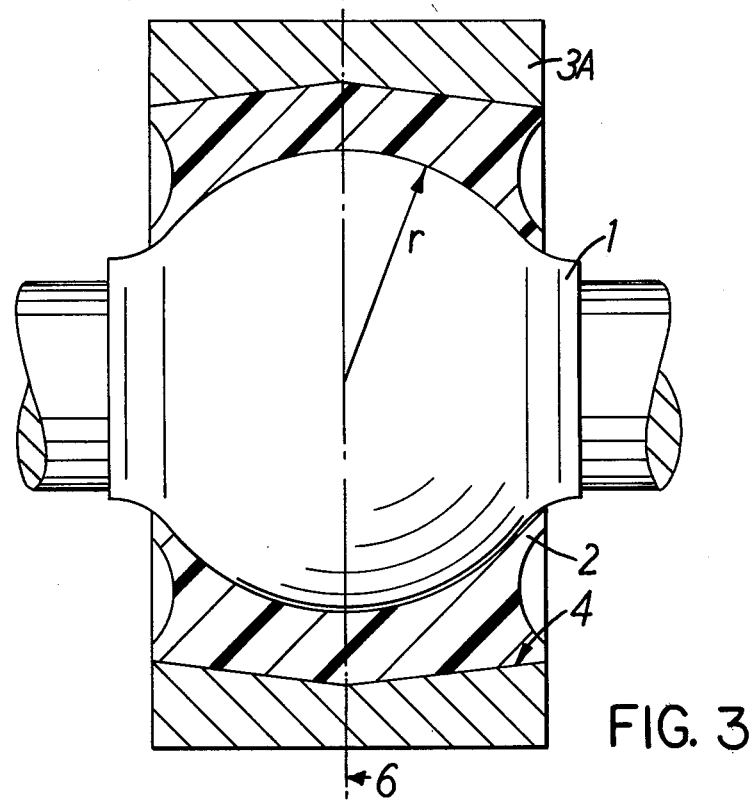
FIG. 3 is an exemplary embodiment of the invention wherein one of the surfaces is spherical and the other is conical.
Figure 4:
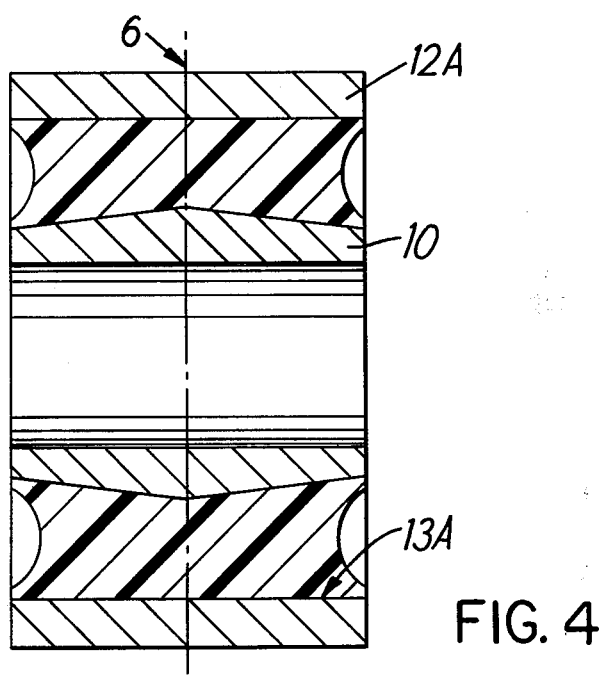
FIG. 4 is an exemplary embodiment of the invention wherein one of the surfaces is conical and the other of the surfaces is cylindrical.

For example, FIG. 3 shows an alternate construction wherein the inner pivot pin 1 has a spherical surface 2 identical to the surface in FIG. 1. However, the inner surface 4A of the outer hub 3A is conical on opposite sides of the central plane 6. The construction of FIG. 4 utilizes an inner hub 10 identical to the hub in FIG. 2. However, the inner surface 13A of the outer hub 12A is cylindrical.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A pivotal joint having limited universal movement, comprising:
    an inner pin member having a continuous first annular surface portion thereon extending radially outwardly of said pin member with its largest radial dimension being located at a point intermediate in its axial length;

a monolithic outer hub member having a continuous annular second surface which surrounds, is centrally disposed with respect to and is radially spaced from said first surface of said inner pin member, said first and second surfaces being convergingly related from the axial ends thereof to the points intermediate their axial lengths;

a single layer of flexible resilient material disposed in the annular space between said inner pin member and said outer hub member, said flexible resilient material being bonded to said first and second surfaces and having a uniform radial compression characteristic throughout the entire axial length of said flexible resilient material, said flexible resilient material having an axial cross section in said annular space which converges from the axial ends thereof to the point intermediate its axial length at a rate such that, upon a relative movement between said inner pin member and said outer hub member, said flexible resilient material is displaced and each planar section of said flexible resilient material contained in planes perpendicular to the axis of said inner pin member undergoes generally the same form change and the volume of the displaced flexible resilient material of a first plane plus the volume of the displaced flexible resilient material of an adjacent second plane is absorbed by the volume between said first and second surfaces between said first and second planes.

2. The pivot pin according to claim 1, wherein one of said first and second surfaces is substantially spherical and the other of said first and second surfaces is substantially conical on opposite sides of said intermediate point thereon.

3. The pivot pin according to claim 1, wherein one of said first and second surfaces is substantially cylindrical.

4. The pivot pin according to claim 1, wherein said first surface is substantially spherical having a first radius and wherein said second surface is substantially spherical having a second radius greater than said first radius, the center point of said second radius being located in a common plane with the center point of said first radius and which extends in a plane perpendicular to said axis of said inner pin member.

5. The pivot pin according to claim 1, wherein said first and second surfaces on opposite sides of said intermediate points are conical.

* * * * *